US009703685B2

United States Patent
Sahni et al.

(10) Patent No.: US 9,703,685 B2
(45) Date of Patent: *Jul. 11, 2017

(54) ORTHOGONAL EXPERIMENTATION IN A COMPUTING ENVIRONMENT

(71) Applicant: eBay Inc., San Jose, CA (US)

(72) Inventors: Jasdeep Singh Sahni, San Jose, CA (US); Anil Madan, San Jose, CA (US); Deepak Seetharam Nadig, San Jose, CA (US); Po Cheung, San Jose, CA (US); Bhavesh Mistry, San Jose, CA (US); John Bodine, Mountain View, CA (US); Michael Lo, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,873

(22) Filed: Feb. 15, 2016

(65) Prior Publication Data

US 2016/0162390 A1  Jun. 9, 2016

Related U.S. Application Data

(60) Continuation of application No. 14/301,280, filed on Jun. 10, 2014, now Pat. No. 9,262,543, which is a
(Continued)

(51) Int. Cl.
*G06F 9/44* (2006.01)
*G06F 11/36* (2006.01)
*G06F 17/30* (2006.01)

(52) U.S. Cl.
CPC ...... *G06F 11/3668* (2013.01); *G06F 11/3688* (2013.01); *G06F 11/3696* (2013.01);
(Continued)

(58) Field of Classification Search
CPC ........... G06F 17/30873; G06F 11/3668; G06F 11/3688; G06F 11/3696; G06F 17/3033; G06F 17/3089
See application file for complete search history.

(56) References Cited

U.S. PATENT DOCUMENTS 6,477,575 B1 * 11/2002 Koeppel ........... G06F 17/30867
705/14.64
6,493,754 B1 * 12/2002 Rosborough ....... G06F 11/3419
709/224

(Continued)

OTHER PUBLICATIONS

"U.S. Appl. No. 12/728,067, Notice of Allowance mailed Dec. 24, 2012", 19 pgs.
(Continued)

*Primary Examiner* — Jing-Yih Shyu
(74) *Attorney, Agent, or Firm* — Schwegman, Lundberg & Woessner, P.A.

(57) ABSTRACT

Various embodiments include at least one of systems, methods, and software to receive input configuring tests within a computing environment to expose users to standard application or website experiences or test experiences. In some embodiments, multiple tests may be configured to run orthogonally within user experiences without affecting the results of one another. Some such embodiments preserve the ability to execute certain tests in anon-orthogonal manner while other tests are allowed to execute orthogonally.

20 Claims, 10 Drawing Sheets

Related U.S. Application Data continuation of application No. 13/867,203, filed on Apr. 22, 2013, now Pat. No. 8,789,019, which is a division of application No. 12/728,067, filed on Mar. 19, 2010, now Pat. No. 8,429,616.

(52) U.S. Cl.
CPC ...... *G06F 17/3033* (2013.01); *G06F 17/3089* (2013.01); *G06F 17/30873* (2013.01)

(56) References Cited

U.S. PATENT DOCUMENTS

| | | | | |
|---|---|---|---|---|
| 6,907,546 B1* | 6/2005 | Haswell | ............ | G06F 11/3684 714/38.11 |
| 7,154,497 B2* | 12/2006 | Allor | ............ | G06F 9/4443 345/419 |
| 7,165,088 B2* | 1/2007 | Cohen | ............ | G06F 17/30893 707/E17.117 |
| 7,673,288 B1* | 3/2010 | Stroomer | ............ | G06F 11/3692 703/14 |
| 7,975,000 B2* | 7/2011 | Dixon | ............ | G06Q 30/02 705/14.41 |
| 7,992,133 B1* | 8/2011 | Theroux | ............ | G06F 11/362 709/201 |
| 8,321,935 B1* | 11/2012 | Chen | ............ | G06F 21/56 726/22 |
| 8,429,616 B2 | 4/2013 | Sahni et al. | | |
| 8,789,019 B2 | 7/2014 | Sahni et al. | | |
| 9,262,543 B2 | 2/2016 | Sahni et al. | | |
| 2003/0014503 A1* | 1/2003 | Legout | ............ | G06F 21/10 709/219 |
| 2005/0182933 A1* | 8/2005 | Ritz | ............ | G06F 17/2247 713/168 |
| 2006/0271671 A1 | 11/2006 | Hansen | | |
| 2007/0022058 A1* | 1/2007 | Labrou | ............ | G06Q 20/32 705/67 |
| 2007/0211696 A1* | 9/2007 | Noble | ............ | H04L 12/2697 370/352 |
| 2007/0220554 A1* | 9/2007 | Barton | ............ | H04N 21/4668 725/46 |
| 2008/0066056 A1* | 3/2008 | Inoue | ............ | G06F 11/3644 717/124 |
| 2010/0082690 A1* | 4/2010 | Kenigsberg | ............ | G06F 17/30067 707/792 |
| 2010/0229150 A1* | 9/2010 | Stone | ............ | G06F 8/00 717/104 |
| 2011/0231821 A1 | 9/2011 | Sahni et al. | | |
| 2013/0239091 A1 | 9/2013 | Sahni et al. | | |
| 2014/0297795 A1 | 10/2014 | Sahni et al. | | |

OTHER PUBLICATIONS

"U.S. Appl. No. 13/867,203, Non Final Office Action mailed Dec. 19, 2013", 8 pgs.

"U.S. Appl. No. 13/867,203, Notice of Allowance mailed Mar. 14, 2014", 16 pgs.

"U.S. Appl. No. 13/867,203, Response filed Jan. 23, 2014 to Non Final Office Action mailed Dec. 19, 2013", 12 pgs.

"U.S. Appl. No. 14/301,280, Non Final Office Action mailed May 7, 2015", 16 pgs.

"U.S. Appl. No. 14/301,280, Notice of Allowance mailed Oct. 13, 2015", 12 pgs.

"U.S. Appl. No. 14/301,280, Preliminary Amendment filed Jul. 9, 2014", 9 pgs.

"U.S. Appl. No. 14/301,280, Respons filed Sep. 8, 2015 to Non Final Office Action mailed Jun. 7, 2015", 9 pgs.

\* cited by examiner

EXPERIMENT SETUP — 902

EXPERIEMENT NAME/ID [          ]  (SELECT) — 904

EXPERIEMENT TYPE [        ▼] — 906

EXPERIEMENT START [MM/DD/YY HH:MM] — 908

EXPERIEMENT END [MM/DD/YY HH:MM] — 910

SITE [          ▼] — 912

— 914

TRAFFIC SPACE USED BY THIS EXPERIMENT - % OF SPECTRUM

START %   END %
[  ]      [  ]   [ - ]
[  ]      [  ]   [ - ]
                 [ + ]

TRAFFIC SPACE MAP — 916

0 1 2 3 4 5 6 7 8 9
(10x10 grid, rows labeled 0-9)

TREATMENT SETUP

920

(CANCEL) — 932    (SAVE) — 934

FIG. 9

ORTHOGONAL EXPERIMENTATION IN A COMPUTING ENVIRONMENT

RELATED APPLICATION DATA

This application is a continuation of U.S. application Ser. No. 14/301,280, filed Jun. 10, 2014 and issued as U.S. Pat. No. 9,262,543, which is a continuation of U.S. application Ser. No. 13/867,203, filed on Apr. 22, 2013 and issued as U.S. Pat. No. 8,789,019, which is a divisional of U.S. application Ser. No. 12/728,067, filed on Mar. 19, 2010, and issued as U.S. Pat. No. 8,429,616, each of which priority is claimed and each of which are incorporated herein by reference in their entirety.

BACKGROUND INFORMATION

In software and systems development, organizations have traditionally maintained separate testing and production computing environments. New code is first tested in the test environment and then moved to the production environment upon successful completion of testing. More recent efforts have allowed for testing in a production environment, but with users being exposed to only a single test at a time. Only a single test per user is allowed to ensure that the test results are not skewed by another test.

BRIEF DESCRIPTION OF THE DRAWINGS

FIG. 9 illustrates a user interface, according to an example embodiment.

DETAILED DESCRIPTION

Figure 1:
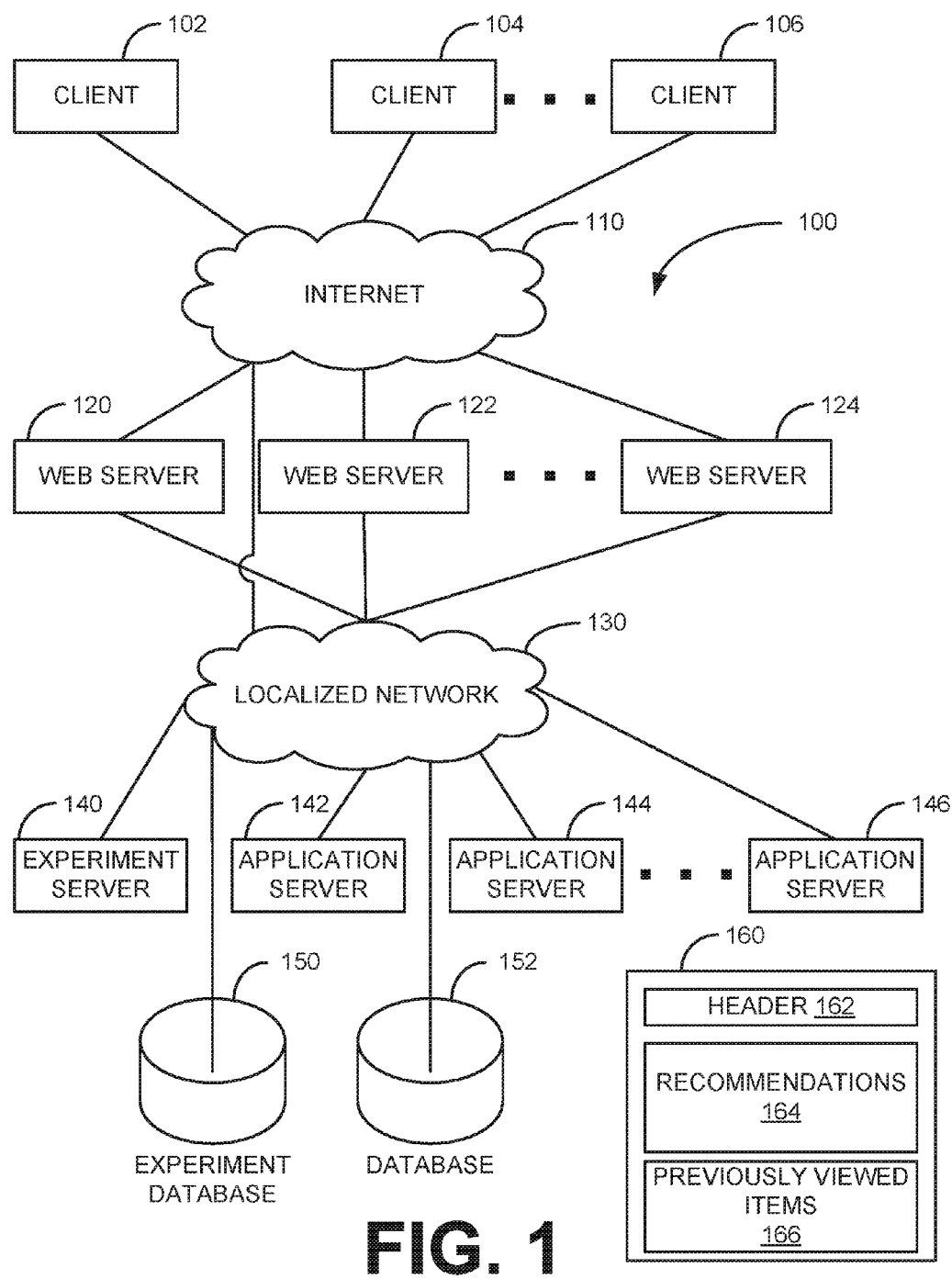
FIG. 1 is a logical block diagram of a computing environment, according to an example embodiment.

Pre-deployment testing of computer applications, computing environments, and user experiences is commonly performed to ensure the success of newly developed or installed software, devices, and other products. In some instances, a test may need to be executed without interference or collision with other tests. However, tests may be able to execute and not be affected or skewed by other tests. Such tests that may simultaneously execute can be allowed to collide with one another and are termed orthogonal tests. Various embodiments described herein provide systems, software, methods, and data structures to configure computing environments and tests allowed to execute in an orthogonal manner.

A test, in some embodiments, is a limited implementation, for experimental purposes, of a portion of code or other system element that modifies a user experience when utilizing an application or visiting a website. A test may be visible in a view presented to a user or may be invisible to the user, instead operating in a backend process of a computing environment of the application or website. A test includes one or more treatments. For example, a particular test may include a single portion of code to be tested. Another test may include two alternate portions of code to be tested where each portion of code to be tested is a treatment. A further test may include two alternate portions of code to be tested and a test control portion of code to be tested where each of the two alternate portions of code and the test control portion of code are treatments. In such test instances including multiple treatments, when a user experience is to be exposed to the test, the user experience will be exposed to a single treatment of the multiple treatments of the test. The test control treatment, when present, is a parallel treatment to verify results obtained through the other treatments of the test instance.

A test may be configured by creating a new test, identifying a number of treatments (one or more) of the test, a portion of software or configuration settings to be implemented through each treatment, and assigning an allotment of application or website bandwidth spectrum to the test and each treatment, if more than one treatment is involved. Input is also received designating the test as either orthogonal, meaning it may collide with other tests, or as an exclusive test that cannot collide with other tests. The test may then be stored and implemented within a computing environment. User interfaces to create and modify test configurations, according to some embodiments, are illustrated and described with regard to FIG. 9-FIG. 11. Explanation of how the application or website bandwidth spectrum traffic is allotted is provided with regard to FIG. 3-FIG. 9.

In some embodiments, after a test is implemented, when a user requests or submits data to an application or website, a determination is made whether the request or submission will be part of one or more tests. As used herein, requests and submissions are commonly referred to as requests in the context of a request for data processing. In some such embodiments, a user identifier is utilized to determine if the request is to be exposed to one or more tests. A hashing algorithm may be applied to the user identifier in such embodiments to provide a hash value. The hash value may then be utilized to identify each of one or more tests, and treatments of the respective tests, to which the request is to be exposed. In other embodiments, experiment identifiers of tests may be retrieved from a database for experiments that are relevant to the particular received request. The user identifier may then be combined with each of the experiment identifiers and the hashing algorithm applied to each combined user identifier and experiment identifier. The hash values are then utilized in such embodiments to identify each test, and treatments of the respective tests, to which the request is to be exposed. The request is then fulfilled with standard production portions of the application or website unless a test was identified for one or more particular portions of the processing. The standard production portions of the application or website are the defaults when a test is not identified. When tests are identified, test experiences are provided.

In the various embodiments herein, multiple tests may be run orthogonally without affecting the results of one another. Some such embodiments preserve the ability to execute certain tests in a non-orthogonal manner while other tests are allowed to execute orthogonally. These and other embodiments are described in detail herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored or otherwise tangibly embodied on computer readable storage media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, Application-Specific Integrated Circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Certain embodiments are described herein as including logic or a number of components, modules, or mechanisms. Modules may constitute either software modules (e.g., code embodied on a machine-readable storage medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as afield programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 1 is a logical block diagram of a computing environment 100, according to an example embodiment. The computing environment 100 includes client computing devices 102, 104, 106 connected to the Internet 110. The client computing devices 102, 104, 106 may be one or more of various types of computing devices capable of communicating data over the Internet 110. Some such devices include personal computers, laptop/notebook/netbook computers, handheld computers, smart phones, set top boxes, media playing devices (e.g., Blu-Ray players, MP3 players), hardware modules within automobiles, and the like. The client computing devices 102, 104, 106 are capable of requesting and receiving data over the Internet 110 from a web site, such as through a web server 120, 122, 124, and provide a view of the web site on a display of the respective client computing devices 102, 104, 106.

The web servers 120, 122, 124 may be physical and logical servers, or simply logical servers that execute on one or more physical computing devices. The web servers 120, 122, 124 operate to receive and respond to requests for data received over the Internet 10 or other network. The web servers 120, 122, 124 may provide web pages, such as web page 160, retrieved over a localized network 130, from one or more database 152, an application server 142, 144, 146, or other server or data storage location. In other embodiments, the web servers 120, 122, 124 and application servers 142, 144, 146 may provide the web page 160 or a portion thereof, such as a header 162, a recommendation portion 164 for a marketplace web page 160, data for a previously viewed items portion 166 of the web page 160, or other portions. In some embodiments, requests for data from the client computing devices 102, 104, 106 or other locations, processes, or devices may be received over the Internet 110 directly by one of the application servers 142, 144, 146. The application servers 142, 144, 146, as with the web servers 120, 122, 124, may be physical and logical servers, or simply logical servers that execute on one or more physical computing devices.

In some embodiments, each of the web servers 120, 122, 124, and the application servers 142, 144, 146, include an application kernel that provides web site functionality and web site management functionality for various purposes within the computing environment 100. The web site management functionality may provide functionality with regard to performance monitoring, load balancing, user activity tracking, and the like. In some embodiments, the kernel also provides testing functionality that determines whether a particular request is to be a participant in a test. In some embodiments, the functionality of the application kernel is provided through an application programming interface (API).

In some embodiments, when a request is received by a web server 120, 122, 124, an application server 142, 144, 146, or other computing or networking device within the computing environment 100, a process of the kernel performs a determination of whether the request is to be exposed to one or more tests. As used herein, an experiment is synonymous with a test unless otherwise indicated. The determination of whether a request is to be exposed to a test may include performing a hashing function against a user identifier (e.g., a Globally Unique Identifier (GUID) of the user—either logical or human), and using the hashed GUID to query the experiment database 150. When an experiment identifier is retrieved from the experiment database 150 in response to the query, the request is processed according to a test of the experiment identifier. When an experiment identifier is not retrieved from the experiment database 150, the request is processed according to a standard, production version of the website. As mentioned above with regard to the web page 160, a request may be received for less than an entirety of the web page 160, such as for a recommendation portion 164. In such instances, the web page 160 provided to a user may provide a test experience to a user on a client computing device 102, 104, 106 with regard to no portions of the web page 160 or one or more portions of the web page 160.

In some embodiments, when a request is received, such as by a web server 120, 122, 124 or an application server 142, 144, 146, the kernel may query the experiment database 150, such as through an experiment server 140, to obtain experiment identifiers of tests to which the request is to be exposed. In one such embodiment, the query may return two or more experiment identifiers. In some such embodiments, a further determination is made to identify a treatment of multi-treatment tests to which the request is to be exposed. The GUID of the requestor and one of the retrieved experiment identifiers are joined and then the hashing function is applied to the joined GUID and experiment identifier. The resulting hash value is then used to identify a treatment of the respective test to which the request is to be exposed.

The different tests identified in the experiment server 140 and experiment database 150 may each be deployed to one or more web servers 120, 122, 124, application servers 142, 144, 146, or other computing and networking devices within the computing environment 100. Thus, upon identification of a test or treatment thereof to which a request is to be exposed, the request may be routed to an appropriate server, computing device, or network device utilizing kernel processes.

Although three web servers 120, 122, 124, three application servers 142, 144, 146, and one database 152 are illustrated in FIG. 1, any number of web servers 120, 122, 124, application servers 142, 144, 146, and databases 152 may be present in the computing environment 100, depending on the requirements of the particular embodiment. Similarly, although one experiment server 140 and one experiment database 150 are illustrated in FIG. 1, the computing environment 100 may include any number of experiment servers 140 and experiment databases 150. In some embodiments, the experiment server 140 and the experiment database 150 may be combined into a single data processing element within the computing environment 100 and may even coexist on a computing device upon which an application server 142, 144, 146, web server 120, 122, 124, or database 152 is present. Other embodiments may not include an application server 142, 144, 146. Thus, the computing environment 100 of FIG. 1 is provided to illustrate an example computing environment architecture upon which some embodiments may be implemented. An example computing device upon which one or more the application servers 142, 144, 146, web servers 120, 122, 124, databases 152, experiment servers 140, and experiment databases 150 may be implemented is illustrated in FIG. 2.

Figure 2:
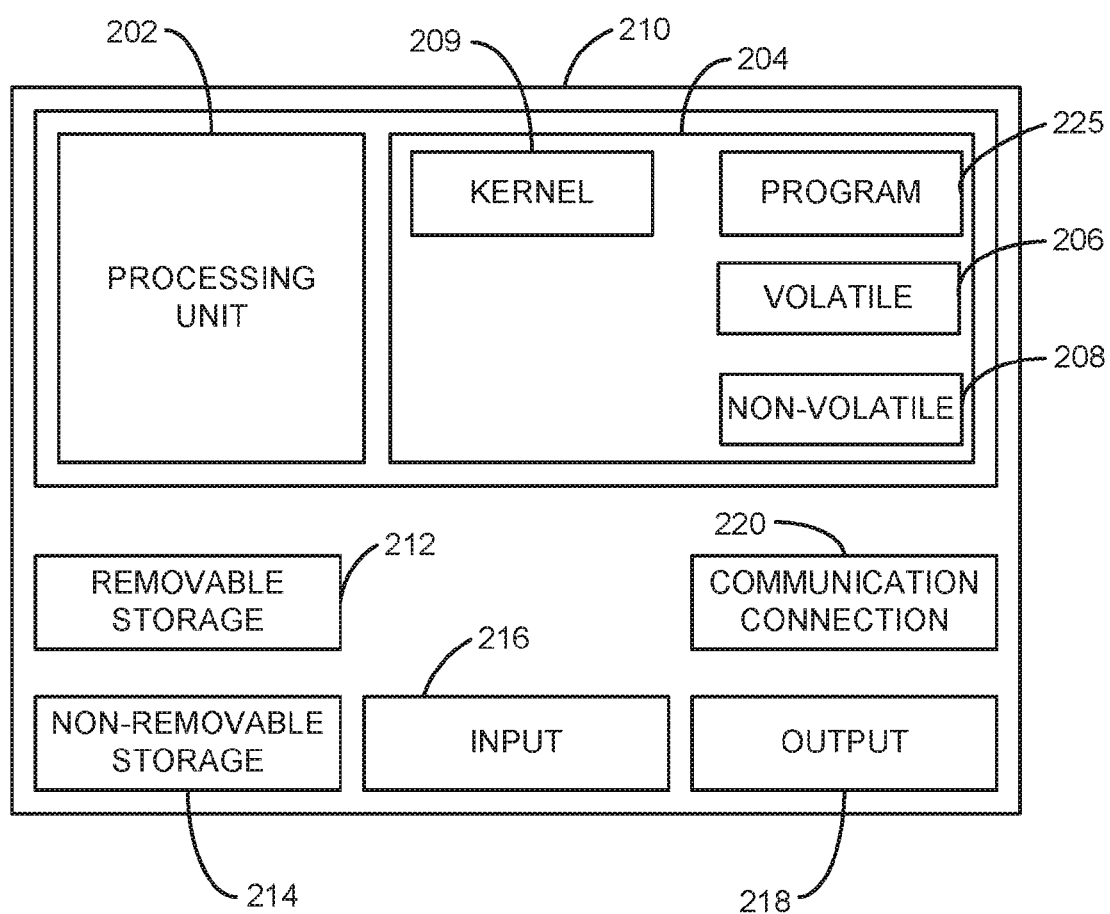
FIG. 2 is a block diagram of a computing device, according to an example embodiment.
Figure 3:
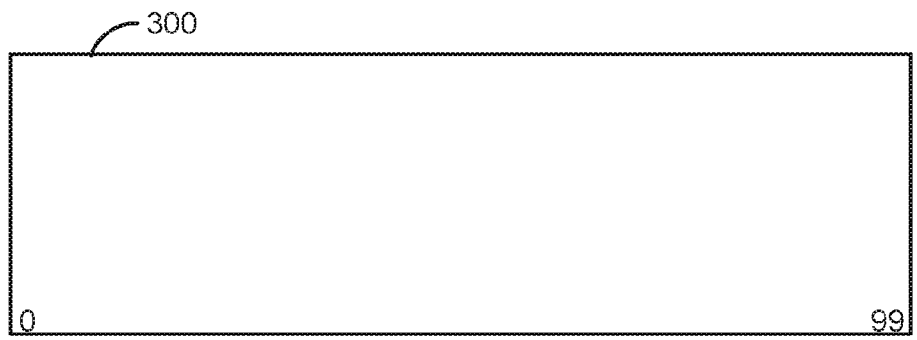
FIG. 3-8 are illustrations of application or website traffic spectrum allotments within configurations of a computing environment.

FIG. 2 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210 may include at least one processing unit 202, memory 204, removable storage 212, and non-removable storage 214. Memory 204 may include volatile memory 206 and non-volatile memory 208. Computer 210 may include or have access to a computing environment that includes a variety of computer-readable storage media, such as volatile memory 206 and non-volatile memory 208, removable storage 212, and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 10 may include or have access to a computing environment that includes input device 216, output device 218, and a communication connection 220, such as a network interface device. The computer 210 may operate in a networked environment using the communication connection to connect to one or more remote computers, such as database servers, application servers, web page servers, and other servers. The remote computer may include a personal computer (PC), server, router, network PC, a peer device or other common network node, or the like. The communication connection may include the Internet, a Local Area Network (LAN), a Wide Area Network (WAN) or other networks.

Computer-readable instructions tangibly stored on a computer-readable storage medium are executable by the at least one processing unit 202 of the computer 210. A hard drive, CD-ROM, and RAM are some examples of articles including a computer-readable storage medium. For example, a computer program 225 capable of execution by the at least one processing unit 202 to cause the computer 210 to perform one or more of the described and claimed methods herein may be stored on such as computer-readable storage medium. A computer-readable storage medium may also store a kernel module or program 209 that executes on the at least one processing unit 202 to provide the kernel services on the computer 210, as discussed above with regard to FIG. 1.

FIG. 3-8 are illustrations of application or website traffic spectrum allotments within configurations of a computing environment. Beginning with FIG. 3, an entire spectrum 300 of traffic is illustrated. In this illustration, the traffic spectrum is divided as percentages from zero (0) to 99. Each percent is a lane of request traffic coming into a website or application that can be assigned for test experiences or non-test experiences, which will be referred to as clean experiences providing the standard production experience of the application or website. Although the traffic spectrum is illustrated and described with regard to percentages of zero (0) to 99, the traffic spectrum may be divided in other ways and at other granularities depending on the needs for a particular embodiment, such as between zero (0) and 1,000.

Figure 4:
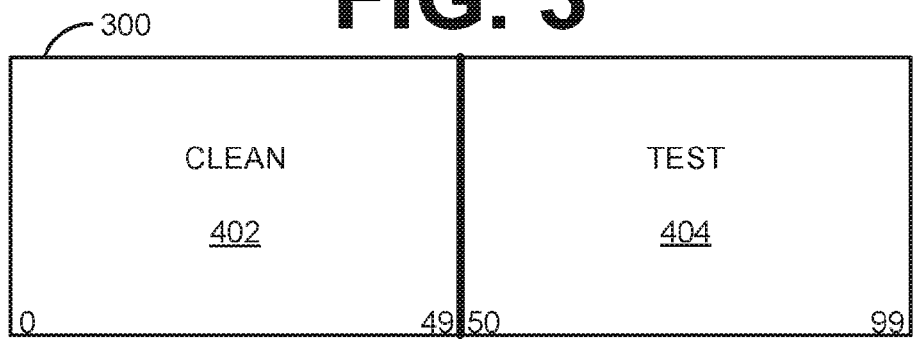

In FIG. 4, the spectrum 300 is divided into a clean experience 402 and a test experience 404. The clean experience 402 is allotted traffic percentages zero (0) through 49. The test experience 404 is allotted traffic percentages 50 through 99. The test experience 404 is a spectrum 300 portion within which tests may, but need not be exposed to requests. The percentages correspond to value assigned to incoming requests from users. In some embodiments, the value is assigned to a request based on a user identifier, such as a GUID of the user. The GUID may be assigned to the user, such as through a kernel process or other common GUID assignment processes, upon receipt of a request. The GUID may also be received with an incoming request. In other embodiments, the user identifier may be another value assigned to a user depending on the particular embodiment. In yet other embodiments, instead of a user identifier, another identification mechanism may be utilized such as an identifier of a request or a value derived from a date and time the request was sent or received.

Regardless of how the identifier is assigned or received, the identifier is converted into a value that corresponds to the values with which the spectrum 300 has been divided. In some embodiments, a hashing function is applied to the identifier to arrive at a number corresponding to spectrum 300 values. For example, in an embodiment where the identifier is a GUID, an MD5 hashing algorithm is applied to the GUID through a function and a value is obtained. If that value is greater than 99, the final two numbers of the value may extracted, The final two numbers will be a number between zero and 99 and, therefore, equating to a spectrum 300 value. That value is then utilized to route the request within either the clean experience 402 or the test experience 404.

Figure 5:
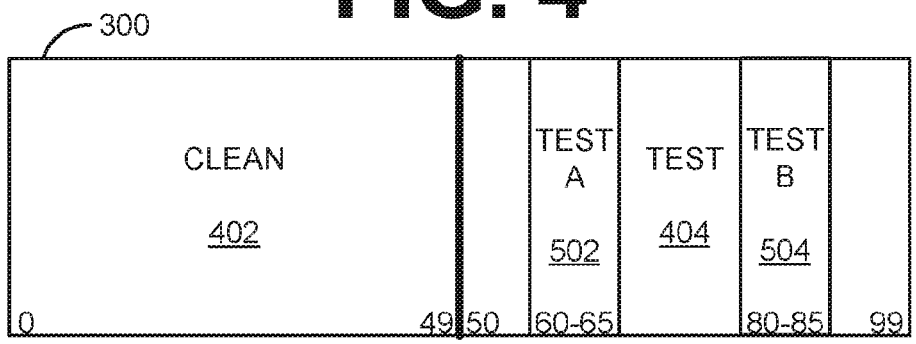

With regard to FIG. 5, the spectrum 300 is again illustrated as are the clean experience 402 and test experience 404. The test experience 404 as illustrated in FIG. 4 did not include any tests. However, the test experience 404 as illustrated in FIG. 5 now includes two tests, test A 502 and test B 504. Test A 502 is allotted spectrum 300 percentages 60 through 65 and test B 504 is allotted spectrum percentages 80-85. As the portions of spectrum 300 allotted to test A 502 and test B 504 do not overlap, the tests are non-orthogonal.

The remaining portions of the spectrum 300 within the test experience 404 (e.g., percentages 50-59, 66-79, and 86-99) are not allotted to tests. In some embodiments, as a request is received from a user, such as by a web server 120, 122, 124 from a user of one of the client computing devices 102, 104, 106, the kernel of the receiving web server 120, 122, 124 identifies the user through a GUID, performs the MD5 hashing algorithm with regard to the GUID, and obtains a number between zero (0) and 99. That number is then used to route the request to the corresponding experience. When the number is within the range 60 and 65, the request is routed for exposure to test A 502. When the number is within the range of 80 and 85, the request is routed for exposure to test B 504. Otherwise, the request is exposed to the standard production experience of the application or website.

Figure 6:
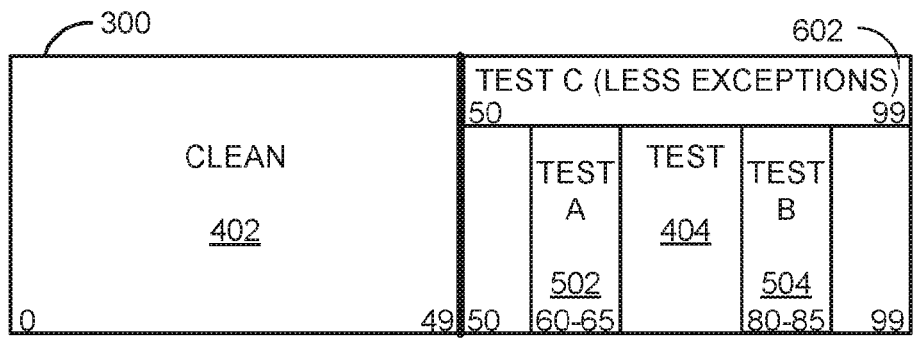

With regard to FIG. 6, the spectrum 300 is illustrated as are the clean experience 4 an test experience 404. The test experience 404 as illustrated in FIG. 5 included test A 502 and test B 504, which are non-orthogonal tests. Test A 502 and test B 504 are included in the test experience 404 of FIG. 6 along with test C 602. Test C 602 is allotted spectrum 300 percentages 50 through 99. Thus, both test A 502 and test B 504 are orthogonal to test C 602. As a result, when a request is routed to spectrum 300 percentages in the range of 60 through 65, the request will be routed for exposure to both test A 502 and test C 602. Similarly, when a request is routed to spectrum 300 percentages in the range of 80 through 85, the request will be routed for exposure to both test B 504 and test C 602.

Figure 7:
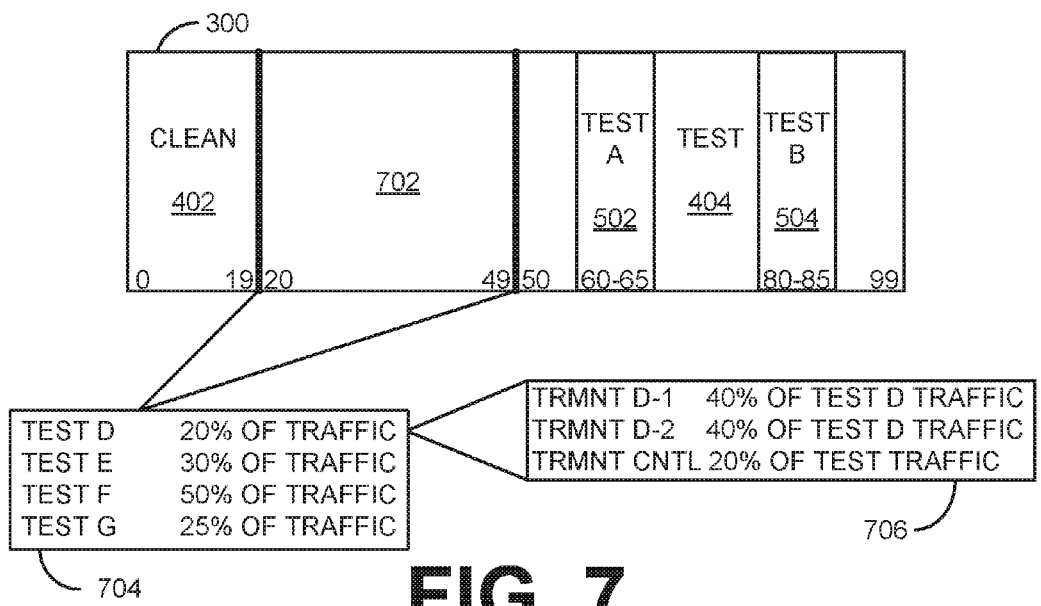

FIG. 7 also includes the spectrum 300 as illustrated and described with regard to FIG. 3 through FIG. 6. However, FIG. 7 introduces an allotment of spectrum 300 percentages to another type of test experience that allows for orthogonal testing in a different manner than already described. In FIG. 7, the clean experience 402 is allotted spectrum 300 percentages of zero (0) through 19 and the test experience 404 is allotted spectrum 300 percentages of 50 through 99. The remaining spectrum 300 percentages twenty (20) through 49 are allotted to this other type of test experience which will be referred to as the "second test experience" 702.

The spectrum 300 portion allotted to the second test experience 702 is available to orthogonal tests 704. The orthogonal tests 704 listed include test E, test F, and test G. Test D is allotted 20 percent of the spectrum 300 allotted to the second test experience 702, test E 30 percent, test F 50 percent, and test G percent. Of note with regards to the percentages of spectrum allotted to each of the tests D, E, F, and G is that the percentages added together is greater than 100 percent. This is intentional as the tests D, E, F, and G are allowed to collide with one another in the orthogonal second test experience 702. It is noted that the percentages allotted to tests D, F, and G are merely examples. Alternative embodiments may allot any combination of percentages to any number of tests within the second test experience 702.

When a test within the second test experience 702 includes more than one treatment, each treatment is also allocated a spectrum percentage. However, this spectrum percentage is not a percentage of the spectrum 300. Instead, the treatment spectrum percentage is a percentage of the spectrum 300 allotment to the particular test. For example, test D of the orthogonal tests 704 includes three treatments 706. Each of these three treatments includes an allotment percentage. For example, treatment D-1 has a 40 percent allotment as does treatment D-2, while treatment CNTL (control) has a 20 percent allotment. Thus, for requests that are to be exposed to test D, 40 percent of those requests will be exposed to treatment D-1, 40 percent will be exposed to treatment D-2, and 20 percent will be exposed to the CNTL treatment.

In embodiments including the second test experience 702, orthogonal tests 704 to which a request is to be exposed are determined independent of one another. For example, a determination of whether a request is to be exposed to test D is performed independent of a determination of whether the same request is to be exposed to test E. In such embodiments, the independent determinations may be made when a request is received from a user by retrieving test identifiers of the tests 704 to which the request might be exposed. The test identifiers may be retrieved from the experiment server 140 or experiment database 150 of FIG. 1. For each retrieved test identifier a user identifier, such as a GUID as described above, is added and the test identifier and the user identifier are hashed together. The resulting value is then used to determine if the request is to be exposed to the respective test 704 of the test identifier. This adding and hashing of a test 704 identifier and the user identifier is performed for each of the tests 704 and a determination is made for each test 704. As a result, a particular request may be exposed to each of the tests 704 D, E, F, and G while another particular request may be exposed to none. Continuing to the determination of which treatment of the test 704 a request is to be exposed, when there is more than one treatment to the test 704, the same hash value of the hashed user identifier and test 704 identifier is used to identify the treatment of the respective test.

Figure 8:
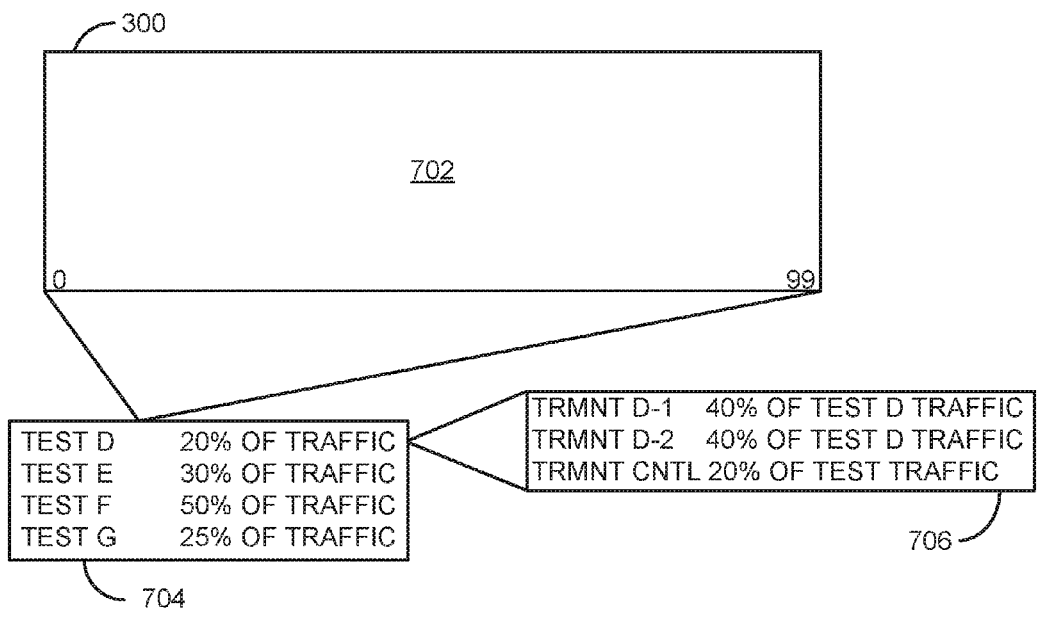

FIG. 8 is another example of an allotment of the spectrum 300. In this illustrated embodiment, the entire spectrum is allotted to the second test experience 702. In other embodiments, the clean experience 402, test experience 404, both shown in FIG. 7, and second test experience 702 may be allotted in varying portions as needed for various testing and operational purposes.

Spectrum 300 portions, in some embodiments, may be reserved for the clean experience 402, the test experience 404, and the second test experience 702 in any proportion. In other embodiments, tests are allotted spectrum 300 portions and the tests are designated as non-orthogonal test (also termed regular tests) or as orthogonal tests. The remaining portions of the spectrum 300 that are not allotted to regular test and orthogonal tests comprise the clean experience 402. Additionally, although the portions of the spectrum 300 allotted to the clean experience 402, the test experience 404, and the second test experience 702 are illustrated in FIG. 4 through FIG. 8 as contiguous portions of the spectrum 300, the clean experience 402, the test experience 404, the second test experience 702, regular tests, and orthogonal tests need not be contiguous.

Figure 10:
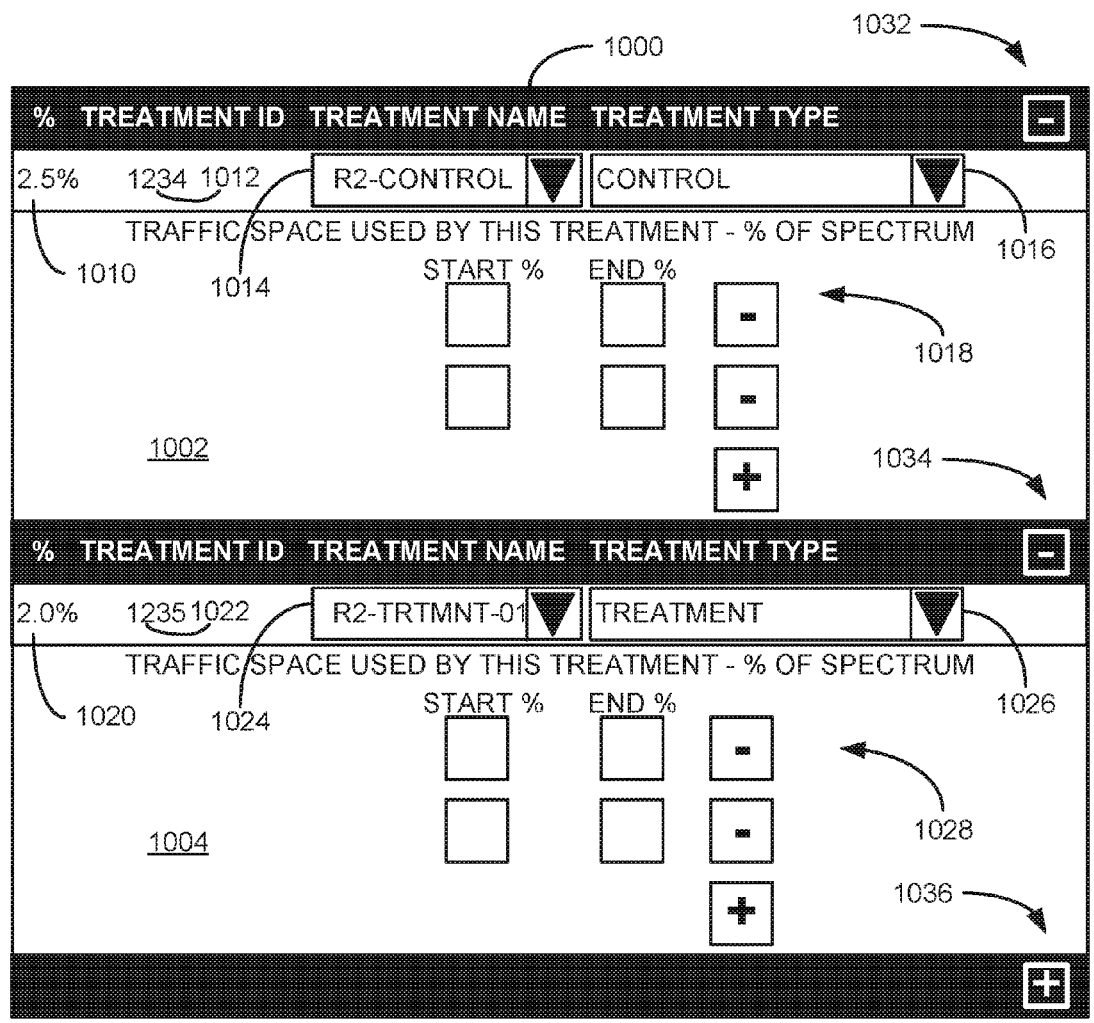
FIGS. 10 and 11 illustrate alternative portions of the user interface of FIG. 9, according to example embodiments.
Figure 11:

FIG. 9 illustrates a user interface 900, according to an example embodiment. FIGS. 10 and 11 illustrate alternative portions 1000, 1100 of the user interface 900 of FIG. 9 according to example embodiments. The user interfaces of FIG. 9, FIG. 10, and FIG. 11 are provided for creation and modification of test configurations.

The user interface 900 of FIG. 9 is a user interface to receive input to create and modify test configurations. The user interface 900 includes an experiment name/ID field 902 where a test name or identifier can be entered manually or populated following selection of an existing test. Selection of an existing test may be performed by selecting the action button 904 labeled "SELECT." Selection of this action button 904 will cause a file listing user interface that allows a user to navigate through storage drives file folders to locate and select files or other data stored locally to or remotely from a computing device providing a view of the user interface 900.

The user interface 900 further includes an experiment type field 906 where a user may select an identifier of the type of experiment being configured. The options may include "REGULAR" and "ORTHOGONAL." The user interface also includes experiment start and end fields 908, 910 where a user may enter start and end dates and times for when the test being configured is to start and end. In some embodiments, the start and end dates and times are not required. In such instances, the test, when stored, will be active until the configuration is modified. In other embodiments, where the start and end dates and times are not required and have not been entered, the test will not be active. Some embodiments of the user interface 900 may also include a site selection control 912 that allows a user to select a website or application the test being configured is to be active within. For example, a test may be configured for one of several websites of an organization.

The user interface 900 additionally includes a traffic allotment control 914 where input is received to designate portions of traffic spectrum to the test being configured. A start percentage and an end percentage are received for each portion of the traffic spectrum to be allotted. For example, a start of zero (0) and an end of four (4) can be entered to allot traffic spectrum in the range of zero (0) to four (4) to the test being configured. Additional portions may also be entered and the portions need not be contiguous. As portions of the traffic spectrum are allotted, a traffic space map 916 is updated to illustrate the allotted portions. Allotted portions of other tests may also be presented in the traffic space map 916. The traffic space map 916 may also indicate portions of the traffic spectrum previously allocated to regular tests that are not allowed to collide with other, regular or orthogonal tests. In such instances, a user may be prevented from entering or storing traffic spectrum allotments for the test being configured that would collide.

The user interface 900 also provides a treatment setup portion 920 that provides user interface controls to receive input selecting and configuring treatments of the test being configured. In some embodiments, the controls displayed in the treatment setup portion 920 vary, however, based on the experiment type selected in the experiment type field 906. For example, the user interface 1000 of FIG. 10 is displayed within the treatment setup portion 920 when the experiment type "REGULAR" is selected in the experiment type field 906, while the user interface 1100 of FIG. 11 is displayed within the treatment setup portion 920 when the experiment type "ORTHOGONAL" is selected in the experiment type field 906.

Once the configuration of the test is complete, the action button 934 labeled "SAVE" can be selected to cause the test configuration to be stored, such as on the experiment server 140 or in the experiment database 150 of FIG. 1. If the test configuration is not to be stored, the action button 932 labeled "CANCEL" may be selected and any changes within the user interface 900 will be ignored and not saved.

The user interface 1000 of FIG. 10 is a user interface to receive input to create and modify test treatments of a REGULAR test being configured in the user interface 900 of FIG. 9. The user interface 1000 includes two treatments 1002, 1004. The treatments 1002, 1004 may be deleted by selecting the buttons 1032, 1034 labeled with a minus sign (−). A treatment may also be added by selecting the button 1036 labeled with a plus sign (+). Each treatment 1002, 1004 includes an allotted spectrum percentage 1010, 1020, a treatment identifier 1012, 1022, a treatment name 1014, 1024, and an identifier of the treatment type 1016, 1026. The allotted spectrum percentage 1010, 1020 is a sum of the traffic spectrum allotted via a traffic allotment control 1018, 1028 of the respective treatment 1002, 1004. The traffic allotment control 1018, 1028 operate similarly to the traffic allotment control 914 illustrated and described with regard to the user interface 900 of FIG. 9, but with regard to a respective treatments 1002, 1004.

The treatment name 1014, 1024 is typically entered by selecting the treatment name control 1014, 1024 and selecting a name associated with a portion of code or other system element to be implemented as the treatment 1002, 1004. The treatment type 1016, 1026 is typically entered by selecting the treatment type 1016, 1026 control and selecting either CONTROL, designating the treatment as a control treatment, or TREATMENT, designating the treatment as a treatment rather than as a CONTROL.

The user interface 1100 of FIG. 11 is a user interface to receive input to create and modify test treatments of an ORTHOGONAL test being configured in the user interface 900 of FIG. 9. The user interface 1100 includes two treatments 1102, 1104. The treatments 1102, 1104 may be deleted by selecting the buttons 1132, 1134 labeled with a minus sign (−). A treatment may also be added by selecting the button 1136 labeled with a plus sign (+). Each treatment 1102, 1104 includes an allotted spectrum percentage 1110, 1120, a treatment identifier 1112, 1122, a treatment name 1114, 1124, and an identifier of the treatment type 1116, 1126.

The allotted spectrum percentage 1110, 1120 is entered by a user and the sum of the allotted spectrum percentages 1110, 1120 of all treatments 1102, 1104 within the user interface 1100 must equal 100 percent. The treatment name 1114, 1124 is typically entered by selecting the treatment name control 1114, 1124 and selecting a name associated with a portion of code or other system element to be implemented as the treatment 1102, 1104. The treatment type 1116, 1126 is typically entered by selecting the treatment type 1116, 1126 control and selecting either CONTROL, designating the treatment as a control treatment, or TREATMENT, designating the treatment as a treatment rather than as a CONTROL.

Figure 12:
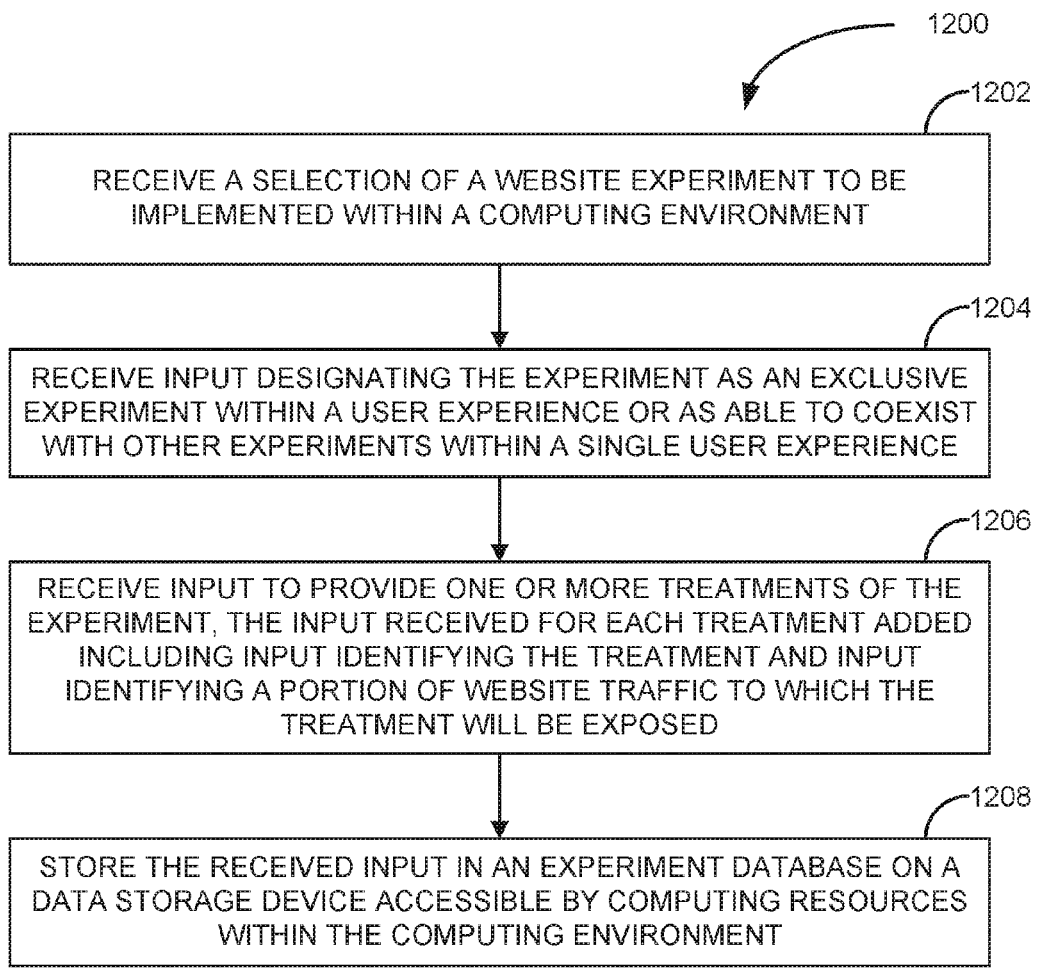
FIG. 12 is a block flow diagram of a method according to an example embodiment.

FIG. 12 is a block flow diagram of a method 1200, according to an example embodiment. The method 1200 is an example of a method that may be implemented along with the user interfaces 900, 1000, and 1100 of FIG. 9, FIG. 10, and FIG. 11, respectively, to implement a website experiment. The method 1200 includes receiving 1202, via a user interface such as may be provided by a server in a web browser, a selection of a website experiment to be implemented within a computing environment, such as the computing environment 100 of FIG. 1. The method 1200 further includes receiving 1204 input designating the experiment as an exclusive experiment, such as a regular test, within a user experience or as able to coexist with other experiments, such as an orthogonal test, within a single user experience. The method 1200 also includes receiving 1206 input to provide one or more treatments of the experiment. The received 1206 input may include for each treatment includes input identifying the treatment and input identifying a portion of website traffic to which the treatment will be exposed. The received 1202, 1204, 1206 input is then stored 1208 in an experiment database, such as experiment database 150 of FIG. 1.

In some embodiments, the method 1200 further includes receiving input designating a start date and an end date for when users will be exposed to the experiment. In some embodiments, receiving 1204 input that designates the experiment as able to coexist with other experiments within a single user experience includes receiving input identifying a portion of website traffic to be exposed to the experiment. In some such embodiments, with regard to each treatment, the input identifying the portion of website traffic to which the treatment will be exposed identifies a portion of the website traffic to which the experiment is exposed.

Figure 13:
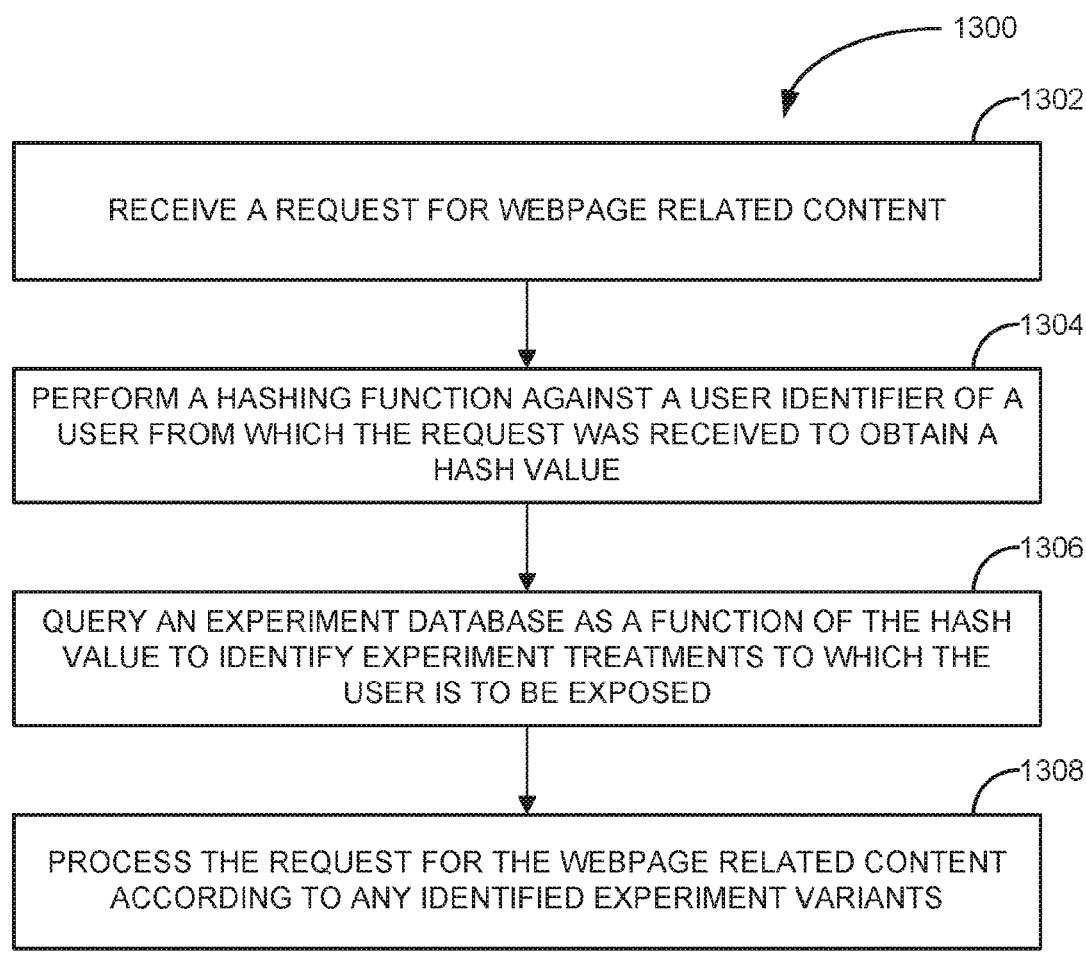
FIG. 13 is a block flow diagram of a method according to an example embodiment.

FIG. 13 is a block flow diagram of a method 1300 according to an example embodiment. The method 1300 is an example of a method for processing received requests for application or website related content or services. Method 1300 is specific with regard to websites. The method 1300 may be implemented by a kernel of an application server, web server, or other device including an application kernel, such as the application kernel 209 of FIG. 2 and as described with regard to FIG. 1 as present on the application servers 142, 144, 146 and the web servers 120, 122, 124.

In some embodiments, the method 1300 includes receiving 1302 a request for webpage related content and performing 1304 a hashing function against a user identifier of a user from which the request was received to obtain a hash value. In some embodiments, the hashing algorithm is an MD5 hashing a algorithm. In other embodiments, the hashing algorithm is another single or multi-round hashing algorithm. The method 1300 further includes querying 1306 an experiment database, such as the experiment database 150 of FIG. 1, as a function of the hash value to identify experiment treatments to which the user is to be exposed. The method 1300 also includes processing 1308 the request for the webpage related content according to any identified experiment variants.

In some embodiments of the method 1300, the received 1302 request for webpage related content is a request for a webpage to be built by at least one process that executes on the at least one processor. In other embodiments the received 1302 request for webpage related content is a request received 1302 from a webpage server that executes to build a webpage including at least one portion generated and provided to the logical webpage server by the processing 1308 of the request for the webpage related content according to any of the experiment treatments identified via the querying 1306.

Figure 14:
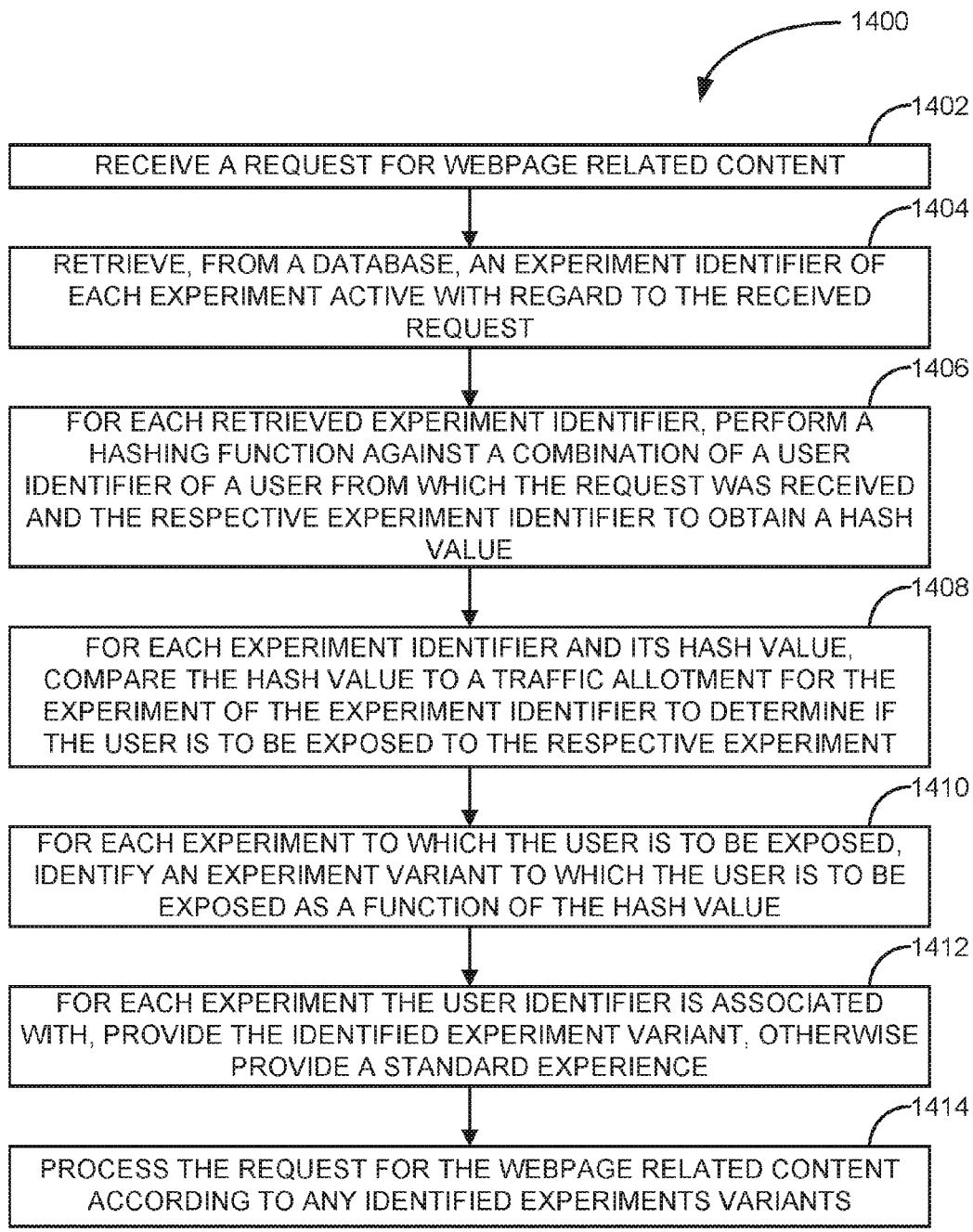
FIG. 14 is a block flow diagram of a method according to an example embodiment.

FIG. 14 is a block flow diagram of a method 1400, according to an example embodiment. The method 1400 is an example method of some embodiments including the second test experience as described and illustrated above with regard to FIG. 7 and FIG. 8. The method 1400 includes receiving 1402 a request for webpage related content and retrieving 1404, from a database such as the experiment database 150 of FIG. 1, an experiment identifier of each experiment active with regard to the received request. For each retrieved experiment identifier, the method 1400 further includes performing 1406 a hashing function against a combination of a user identifier of a user from which the request was received 1402 and the respective experiment identifier to obtain a hash value. For each experiment identifier and its hash value, the method 1400 further includes comparing 1408 the hash value to a traffic allotment for the experiment of the experiment identifier to determine if the user is to be exposed to the respective experiment. Further, for each experiment to which the user is to be exposed, the method 1400 includes identifying 1410 an experiment variant to which the user is to be exposed as a function of the hash value. Absent an identified 1410 experiment variant, the user is provided a standard experience with regard to the requested 1402 webpage related content. However, for each experiment the user identifier is associated with, the method 1400 includes providing 1412 the identified experiment variant and processing 1414 the request for the webpage related content according to any identified experiments variants.

In some embodiments of the method 1400, a start date and an end date are stored in the database in association with at least one experiment. In such embodiments, retrieving 1404 the experiment identifier of each experiment active with regard to the received request may include retrieving 1404 experiment identifiers with a start date equal to or prior to a current date and an end date prior or equal to the current date.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   at least one processor;
   at least one memory device;
   at least one network interface device; and
   instructions held in the at least one memory device, the instructions retrievable from the at least one memory device and executable by the at least one processor to cause the system to perform a method comprising:
     identifying a first test experience and a second test experience;
     defining a spectrum of incoming traffic values, having a minimum value and a maximum value;
     allocating a first range in the spectrum of incoming traffic values to the first test experience;
     allocating a second range in the spectrum of incoming traffic values to the second text experience;
     receiving a web page request including an identifier associated with a user;
     converting the identifier into a value within the spectrum of incoming traffic values;
     determining whether the value falls within the first range or the second range; and
     responsive to determining that the value falls within the first range or the second range, processing the web page request according to the test experience associated with the range that the value falls into.

2. The system of claim 1, wherein the method further comprises:
   receiving data designating a start date and an end date for when users will be exposed at least one of the first test experience and the second test experience.

3. The system of claim 1, wherein the received request for webpage related content is a request for a webpage to be built by at least one process that executes on the at least one processor.

4. The system of claim 1, wherein the received web page request is a request received via the at least one network interface device from a logical webpage server that executes to build a webpage including at least one portion generated and provided via the at least one network interface device to the logical webpage server by the processing of the request for the webpage related content according to any of the identified test experiences.

5. The system of claim 1, wherein the identifier associated with a user is a globally unique identifier (GUID).

6. The system of claim 5, wherein the GUID is received with a request for webpage related content.

7. The system of claim 1, wherein a third range in the spectrum of incoming traffic values is not assigned to any test experience.

8. The system of claim 1, wherein converting the identifier into a value within the spectrum of incoming traffic values further comprising:
   applying a hash value to the identifier to produce a value within the spectrum of values.

9. The system of claim 1, wherein the first range and the second range have at least some overlapping values.

10. The system of claim 9, further comprising responsive to determining that the value falls within the first range and the second range, processing the web page request according to both test experiences.

11. A method comprising:
    identifying a first test experience and a second test experience;

defining a spectrum of incoming traffic values, having a minimum value and a maximum value;
allocating a first range in the spectrum of incoming traffic values to the first test experience;
allocating a second range in the spectrum of incoming traffic values to the second text experience;
receiving a web page request including an identifier associated with a user;
converting the identifier into a value within the spectrum of incoming traffic values;
determining whether the value falls within the first range or the second range; and
responsive to determining that the value falls within the first range or the second range, processing the web page request according to the test experience associated with the range that the value falls into.

12. The method of claim 11, wherein the method further comprises:
receiving data designating a start date and an end date for when users will be exposed to at least one of the first test experience and the second test experience.

13. The method of claim 11, wherein the received request for webpage related content is a request for a webpage to be built by at least one process that executes on the at least one processor.

14. The method of claim 11, wherein the received web page request is a request received via the at least one network interface device from a logical webpage server that executes to build a webpage including at least one portion generated and provided via the at least one network interface device to the logical webpage server by the processing of the request for the webpage related content according to any of the identified test experiences.

15. The method of claim 11, wherein the identifier associated with a user is a globally unique identifier (GUID).

16. The method of claim 15, wherein the GUID is received with a request for webpage related content.

17. A non-transitory computer-readable storage medium, with instructions stored thereon, which when executed by at least one processor of a computer, causes the computer to perform a method comprising:
identifying a first test experience and a second test experience;
defining a spectrum of incoming traffic values, having a minimum value and a maximum value;
allocating a first range in the spectrum of incoming traffic values to the first test experience;
allocating a second range in the spectrum of incoming traffic values to the second text experience;
receiving a web page request including an identifier associated with a user;
converting the identifier into a value within the spectrum of incoming traffic values;
determining whether the value falls within the first range or the second range; and
responsive to determining that the value falls within the first range or the second range, processing the web page request according to the test experience associated with the range that the value falls into.

18. The non-transitory computer-readable storage medium of claim 17, wherein the method further comprises:
receiving data designating a start date and an end date for when users will be exposed to at least one of the first test experience and the second test experience.

19. The non-transitory computer-readable storage medium of claim 17, wherein the received request for webpage related content is a request for a webpage to be built by at least one process that executes on the at least one processor.

20. The non-transitory computer-readable storage medium of claim 17, wherein the received web page request is a request received via the at least one network interface device from a logical webpage server that executes to build a webpage including at least one portion generated and provided via the at least one network interface device to the logical webpage server by the processing of the request for the webpage related content according to any of the identified test experiences.

* * * * *

UNITED STATES PATENT AND TRADEMARK OFFICE
CERTIFICATE OF CORRECTION

PATENT NO. : 9,703,685 B2  
APPLICATION NO. : 15/043873  
DATED : July 11, 2017  
INVENTOR(S) : Jasdeep Singh Sahni et al.

Page 1 of 1

It is certified that error appears in the above-identified patent and that said Letters Patent is hereby corrected as shown below:

On the Title Page

In item (57), in Column 2, in "Abstract", Line 8, delete "anon" and insert -- a non --, therefor.

In the Claims

In Column 14, Line 19, in Claim 1, delete "text" and insert -- test --, therefor.

In Column 15, Line 6, in Claim 11, delete "text" and insert -- test --, therefor.

In Column 16, Line 10, in Claim 17, delete "text" and insert -- test --, therefor.

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*